Aug. 16, 1966      G. STAVIS      3,266,365
DOUBLE DETECTOR-TIME CORRELATION RANGEFINDER
Filed Dec 6, 1962      3 Sheets-Sheet 1
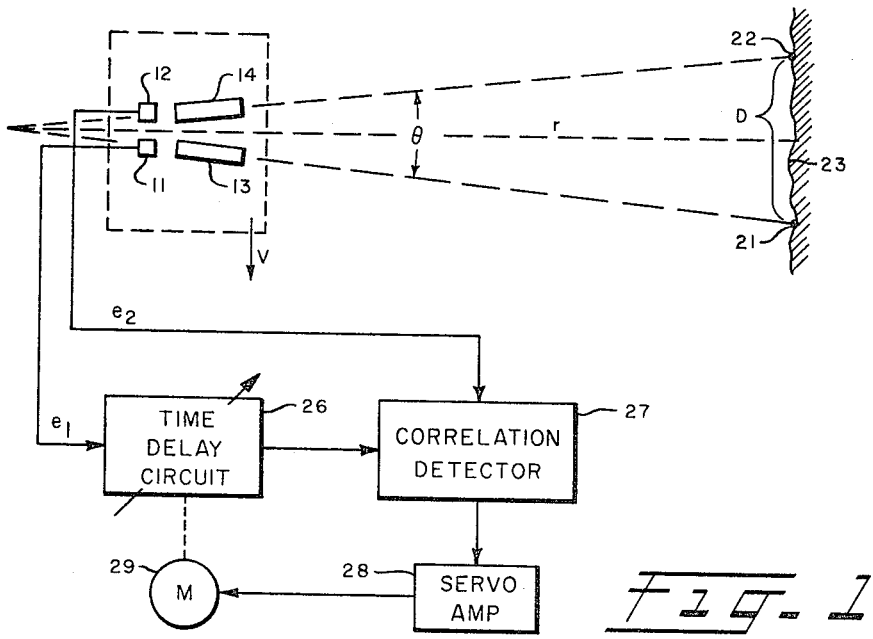
*Fig. 1*
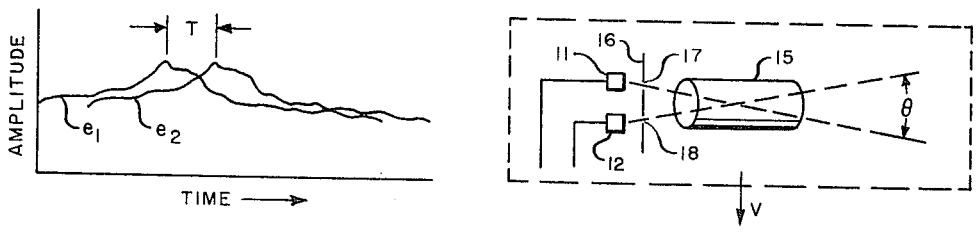
*Fig. 2*      *Fig. 3*
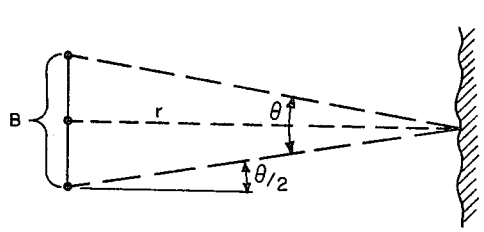
*Fig. 5*
INVENTOR.
GUS STAVIS
BY *H. A. Mackey*
ATTORNEY.

Aug. 16, 1966 G. STAVIS 3,266,365
DOUBLE DETECTOR–TIME CORRELATION RANGEFINDER
Filed Dec. 6, 1962 3 Sheets-Sheet 2
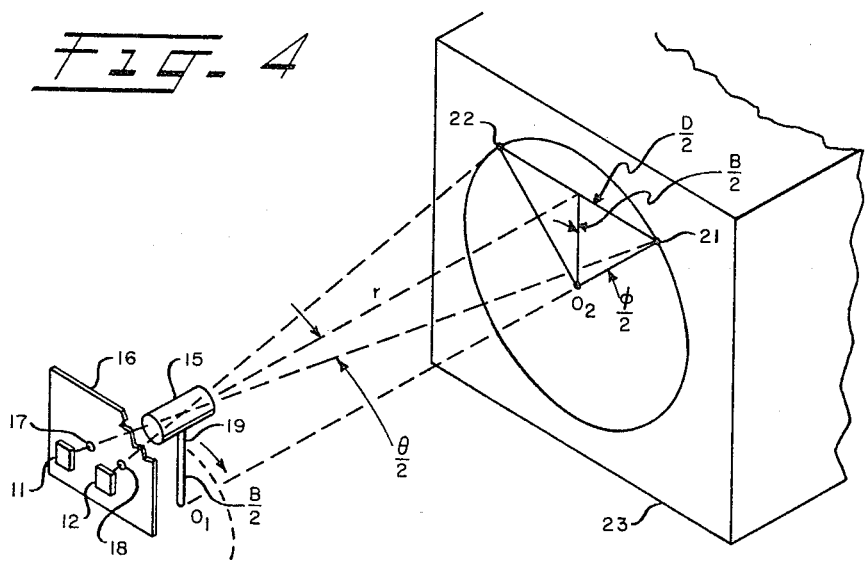
FIG. 4
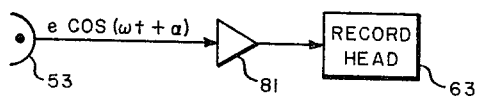
FIG. 9
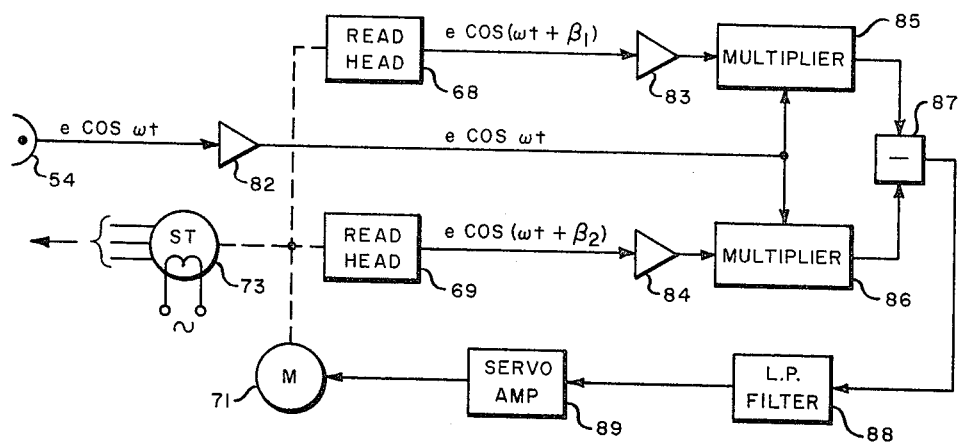
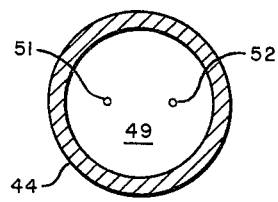
FIG. 8
INVENTOR.
GUS STAVIS
BY
ATTORNEY.

INVENTOR.
GUS STAVIS

BY

ATTORNEY.

United States Patent Office 3,266,365
Patented August 16, 1966

3,266,365
DOUBLE DETECTOR-TIME CORRELATION RANGEFINDER
Gus Stavis, Briarcliff Manor, N.Y., assignor to General Precision, Inc., a corporation of Delaware
Filed Dec. 6, 1962, Ser. No. 242,881
8 Claims. (Cl. 88—1)

This invention relates generally to rangefinders and particularly to an automatically operated optical rangefinder.

A conventional rangefinder incorporates two optical paths separated by a base line together with an arrangement for adjusting the convergence of the paths so that they intersect at the object the range of which is to be determined. The convergence adjustment may be directly coupled to an indicator calibrated in distance units such as feet or yards and in addition may be coupled to other devices such as a camera lens or a computer. Such rangefinders are widely used but have their limitations. First, the accuracy of range measurement decreases as the range increases. Second, an operator is required to adjust the instrument, as by superposing or aligning two images. Thus the range determination is dependent upon human judgment and, in addition, requires a significant amount of time.

It is a general object of the present invention to provide an improved rangefinder.

Another object is to provide a rangefinder in which range is determined quickly and accurately.

Another object is to provide a rangefinder in which range is determined automatically without relying upon human judgment in making adjustments.

Another object is to provide a rangefinder in which the probable percentage error does not vary greatly with range.

Briefly stated, the invention comprises two photoelectric sensors each lying on one of two divergent optical paths from the instrument to the target. Apparatus is provided for moving both optical paths simultaneously so that they scan the same portion of the target successively. Ambient light reflected from the target along these paths to the sensors causes the sensors to generate identical signals one of which is delayed in time with respect to the other. The geometry of the paths and their movement is selected so that this time delay is a function of range. Time delay, and therefore range, is measured by electronic correlation techniques. More specifically, the leading signal is passed through a time delay circuit and then compared with the lagging signal in such a way as to generate an error signal which in turn adjusts the time delay circuit for maximum correlation.

For a clearer understanding of the invention reference may be made to the following detailed description and the accompanying drawings, in which:

FIGURE 1 is a schematic diagram illustrating the principles of the invention.

FIGURE 2 is a graph useful in explaining the invention.

FIGURE 3 is a schematic diagram showing an alternate optical system.

FIGURE 4 is a schematic diagram showing the geometry of a preferred embodiment of the invention.

FIGURE 5 is a schematic diagram showing the geometry of a conventional rangefinder.

FIGURE 8 is a cross-section view taken on the plane 8—8 of FIGURE 7.

FIGURE 9 is a schematic diagram of the electrical connections of the invention.

Figure 6:
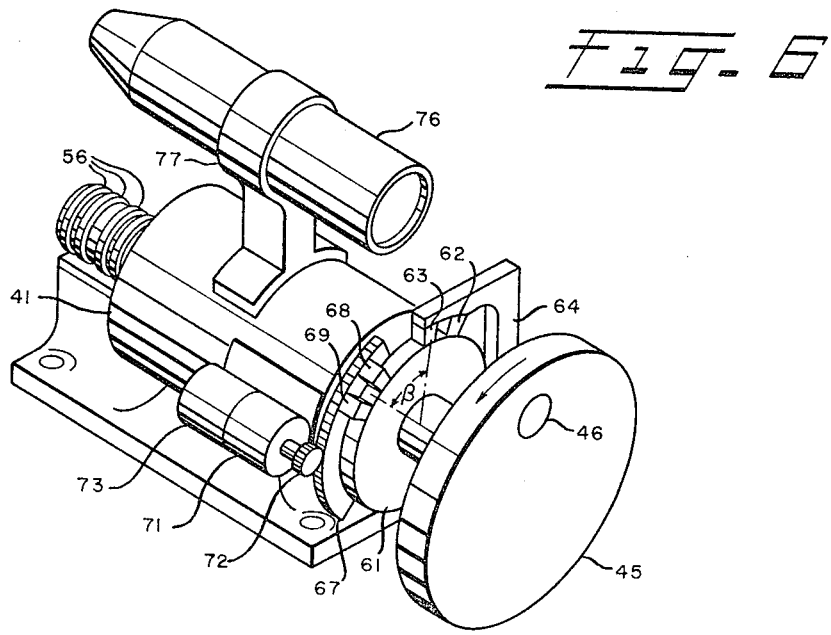
FIGURE 6 is a pictorial view of a preferred embodiment of the invention.

Referring first to FIGURE 1, there are shown two photoelectric sensors 11 and 12, such as photocells or photomultipliers, for generating signals $e_1$ and $e_2$ indicative of the amount of light falling thereon. The sensors 11 and 12 are positioned on the optical axes of two telescopes 13 and 14, respectively, both of which are directed toward a target 23. The two optical axes lie in the same plane and diverge by an angle $\theta$. The axes intersect the target at points 21 and 22 which are spaced apart a distance, D. Ambient light reflected from points 21 and 22 is collected by the telescopes 13 and 14 and directed to the sensors 11 and 12, respectively. The entire assembly of telescopes and sensors is assumed to be moving with a constant velocity V in a direction lying in the plane containing the two optical axes and perpendicular to the line bisecting them. As the areas 21 and 22 moves, the light reflected from each will vary. The area 22 will traverse the path previously travelled by the area 21 so that the signals $e_1$ and $e_2$ will be identical in form but displaced in time as shown in FIGURE 2. The time lag T is obviously $$T = \frac{D}{V} \quad (1)$$

The distance D is dependent on the range measured to the target from the intersection of the two telescope axes and is given by $$D = 2r \tan \frac{\theta}{2} \quad (2)$$

From Equations 1 and 2 the range may be expressed as $$r = \left(\frac{V}{2 \tan \frac{\theta}{2}}\right) T \quad (3)$$

The expression in parentheses is constant so that there is a linear dependence between the independent and dependent variables, T and $r$. This is a favorable situation which permits constant percent accuracy in range for a given ability to measure the delay time T, and thus is independent of range.

In order to measure the time T, the signal $e_1$ from the sensor 11 is delayed by a time delay circuit 26 and is then compared with the signal $e_2$ in a correlation detector 27. The circuit 27 is arranged, as will be more fully explained, to generate an error signal when the correlation is not optimum. The error signal controls a servo amplifier 28 which in turn controls a motor 29 which adjusts the amount of time delay introduced by the circuit 26. The amount of such delay is a measure of range.

FIGURE 1 has illustrated the use of two separate telescopes but it is actually preferable to obtain the two optical paths by means of a common lens system as illustrated in FIGURE 3. In this figure there is shown a lens system 15 which may be a telescope or simply a long focal length lens. An aperture plate 16 is placed in the focal plane of the lens 15 and contains two pinholes 17 and 18 behind which the sensors 11 and 12 are mounted. The position of the plate 16 with respect to the lens 15 and the distance between the pinholes determines the convergence angle $\theta$ and for this reason the plate 16 and its mounting should be as stable as possible.

The arrangement of FIGURE 1, whether using two separate telescopes or a single optical system, is somewhat impractical because it assumes continuous translation of the optical system across the target. This is an awkward motion to implement. Furthermore, the scan will eventually go beyond the bounds of the target, precluding further measurement. A more practical arrangement is shown in FIGURE 4 where a single lens system 15, an aperture plate 16, and sensors 11 and 12 are mounted as described in connection with FIGURE 3. Instead of linear motion, the entire system is mounted on a radius arm 19 having a length $B/2$ so as to be rotatable about an axis $O_1$–$O_2$ at an angular velocity $\omega$.

The rays defined by the lens 15 and the pinholes 17 and 18 lie in the same plane and diverge by an angle $\theta$. This plane preferably includes the optical axis of the lens 15 but in any event is parallel thereto and also parallel to the axis $O_1$–$O_2$; the plane is carried around the axis $O_1$–$O_2$ at a radius $B/2$; the rays terminate at areas 21 and 22 a distance D apart on the target 23; and the areas 21 and 22 describe a circle on the target as the optical system rotates.

Since the two rays diverge, the diameter of the circle described at the target increases with an increase in range. However, the significant change is that related to the delay time T between the scan derived voltages $e_1$ and $e_2$. Each of these voltages will now be periodic with a frequency equal to the angular frequency $\omega$. As before, these voltage waveforms will be identical in shape but with a time delay T which depends on the phase angle, $\phi$, the angle subtended at point $O_2$ by the areas 21 and 22. The relationship is $$T = \frac{\phi}{2\pi} \cdot \frac{1}{\omega} \tag{4}$$

Thus, in order to measure range, we must measure the phase angle, $\phi$, between $e_1$ and $e_2$. It is obvious from FIGURE 4 that tan $$\frac{\theta}{2} = \frac{D/2}{r}$$

and that $$\tan = \frac{D/2}{B/2}$$

from which $$r = \frac{B}{2 \tan \theta/2} \cdot \tan \frac{\phi}{2} \tag{5}$$

The percentage range error as a function of the error in the measurement of the phase angle, $\phi$, can be shown, by straightforward analysis, to be $$\text{Percent range error} = \frac{100 \, d\phi}{\sin \phi} \tag{6}$$

It is obvious that this error is a minimum when $\sin \phi = 1$, or when $\phi = 90°$, for a given ability to measure $\phi$ to within an accuracy $d\phi$. Accordingly, it is desirable to choose the system parameters (B and $\theta$) to make $\phi$ equal to 90° at the most often used range.

In one sense the parameter B may be regarded as the base line of the instrument since it is the diameter of the orbit of the optical system. The greater B becomes, the more accurately the range may be determined. However, there is a limitation because the circle described as the areas 21 and 22 rotate must remain within the bounds of the target. With this limitation in mind, B and $\theta$ may be selected to make $\phi$ equal to 90° at the desired range.

It is interesting to compare the present invention with a conventional rangefinder such as illustrated in FIGURE 5. Such a rangefinder employs a base line of length B from opposite ends of which optical paths extend to the target. The convergence angle $\theta$ is adjusted until the two paths intersect at the target. From FIGURE 5 it is obvious that $$r = \frac{B/2}{\tan \theta/2} \tag{7}$$

It may be shown readily that the percentage range error as a function of the error in the measurement of the convergence angle $\theta$ may be expressed as $$\text{Percent range error} = \frac{-200}{\sin \theta} d\left(\frac{\theta}{2}\right) \tag{8}$$

Although Equation 8 (for the conventional rangefinder) appears similar to Equation 6 (for the present invention), there is in reality a vast difference because it is the convergence angle $\theta$ that appears in Equation 8 while it is the phase angle $\phi$ which appears in Equation 6. The significance of this difference appears when one compares the precision in angular measurement required to limit the range error to 1%.

Consider a numerical example in which the range is 2,000 yards and the base line, B, of each instrument is 1 foot. For the present invention, assuming the construction to be optimum at 2,000 yards, $D = B = 1$ foot and $\phi = 90°$. From Equation 6

$$1 = \frac{100 \, d\phi}{\sin \phi}$$

from which $$d\phi = 0.01 \text{ radians} = 0.57 \text{ degrees}$$

For the conventional rangefinder, tan $$\theta/2 = \frac{B}{2r}$$

from which $\theta =$ approximately 1/6,000 radians. From Equation 8

$$1 = \frac{200}{\sin \theta} d\left(\frac{\theta}{2}\right)$$

from which $$d\left(\frac{\theta}{2}\right) = 4.7 \times 10^{-5} \text{ degrees}$$

Obviously there is a great difference in the precision of measurement required to achieve the specified 1% accuracy by the two methods. This is because the burden of accuracy in the conventional rangefinder is on the mechanical adjustment of the converging lines of sight. In the present invention the corresponding parameter is fixed and a different variable function of range is measured.

Figure 7:
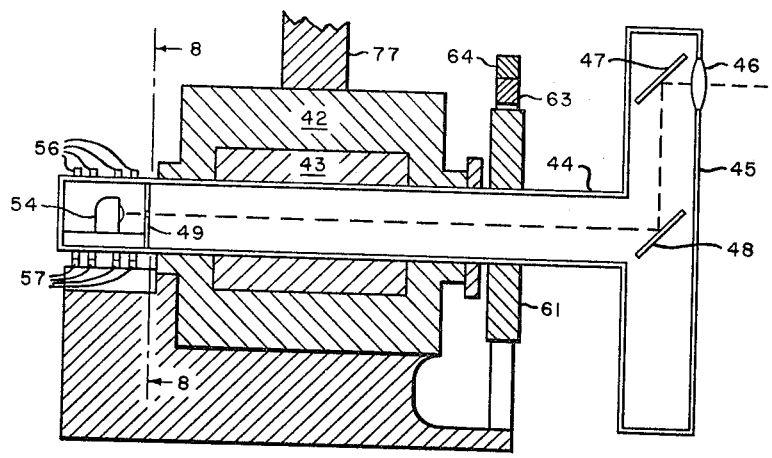
FIGURE 7 is a longitudinal cross-section view of the embodiment of FIGURE 6.

Referring now to FIGURES 6 and 7, disclosing the mechanical construction of a preferred embodiment, there is shown an electric motor 41 comprising a stator 42 and a rotor 43 mounted on a hollow shaft 44. A hollow cylinder 45 is fastened to one end of the shaft 44 and has an objective lens 46 mounted in an opening in the flat surface near the periphery. Behind the lens 46 is mounted a flat mirror 47 for reflecting rays of light from the lens 46 toward the center of the shaft 44 and cylinder 45 where there is fastened another flat mirror 48 which reflects the light approximately along the axis of the shaft 44. Near the end of the shaft 44 is an aperture plate 49 which, as best shown in FIGURE 8, contains two pinholes 51 and 52 behind each of which is mounted a photoelectric sensor, one of which, the sensor 54, can be seen in FIGURE 7.

Mounted on the periphery of the shaft 44 near the end remote from the cylinder 45 are several slip rings 56 which cooperate with stationary brushes 57 to enable power to be applied to and signals withdrawn from the sensors 53 and 54 which may be photomultipliers.

Fastened to the hollow shaft 44 between the motor 41 and the cylinder 45 is a drum 61 made of or coated with a magnetic material, such as a finely divided iron oxide, suitable for recording signals in the form of variations in magnetism. An "erase" head 62 and a "record" head 63 are mounted on a stationary bracket 64 so as to be in operative proximity to the surface of the drum 61. A gear sector 67 is mounted to be freely rotatable about the shaft 44 and has fastened thereto two "read" heads 68 and 69 in operative proximity with the drum 61. The frame of the motor 41 has mounted thereon a small servo motor 71 the shaft of which drives a pinion 72 which meshes with the gear 67 so that the angular position of the "read" heads 68 and 69 with respect to the "record" head 63 may be adjusted. A synchro transmitter 73 is also mounted on the frame of the motor 41 and its rotor is connected through suitable gearing (not shown) to the shaft of the motor 71 so as to generate a signal indicative of the angular position of the gear sector 67 and the heads 68 and 69.

In operation, the entire device is directed toward the target by means of a telescope 76 fastened to the frame of the motor 41 by a bracket 77. Power is turned on and the motor 41 rotates the hollow shaft 44 and the cylinder 45 at a convenient speed such as 30 c.p.s. Light reflected from a circular area on the target is refracted by the lens 46 and reflected by the mirrors 47 and 48 through the pinholes 51 and 52 to the sensors 53 and 54. As previously explained, the sensors generate signals at the rotational rate (30 c.p.s.) which are identical in form but one of which is delayed with respect to the other. The leading signal from sensor 54 is amplified and applied to the "record" head 63. The "read" heads 68 and 69 pick off signals which are substantially identical to that recorded but delayed in time. A single "read" head would be more comparable to the circuit of FIGURE 1 but it is preferred to use two heads in order to simplify the instrumentation. By a circuit to be more fully described, the signals from the two "read" heads 68 and 69 are combined with the signal from the sensor 53 so as to generate an error signal when the anble $\beta$ between the "record" head 63 and the center line between the "read" heads 68 and 69 does not represent the time delay between the signals generated by the sensors 53 and 54. This error signal controls the motor 71 to position the gear 67 and heads 68 and 69 until the error signal vanishes at which time the angle $\beta$ is equal to the angle $\phi$ of FIGURE 4 and is indicative of the range.

The quality of the match between two functions of the same independent variable is often expressed as the correlation function which is equal to the average value of the product of the two functions. Of present interest is the special case wherein the two functions are identical except for a variable phase displacement, in which case the correlation function is a maximum when the functions are in phase. Although not, in general, of sinusoidal form, the functions here involved may be considered as being made up of sinusoidal components of the form $e \cos \omega t$ and $e \cos (\omega t + \alpha)$. These expressions may be multiplied together and, when transformed by trigonometric identities, the product may be expressed as $$\frac{e^2}{2} [\cos (2\omega t + \alpha) + \cos (-\alpha)] \quad (9)$$

When this expression is averaged over a number of cycles, it is obvious that the first term is zero and that the second term is a constant, its value depending upon $\alpha$ and being a maximum when $\alpha = 0$. These principles are utilized in the present invention in the manner shown in FIGURE 9.

Referring now to FIGURE 9, the voltage generated by the sensor 53 leads that generated by the sensor 54 and accordingly the voltages may be designated $e \cos (\omega t + \alpha)$ and $e \cos \omega t$, respectively. They are increased in amplitude by amplifiers 81 and 82 respectively. The leading voltage, $e \cos (\omega t + \alpha)$ is applied to the "record" head 63 so as to place a signal on the drum 61 (FIGURES 6 and 7). This signal induces voltages in the "read" heads 68 and 69 which lag the voltage in the "record" head and which may be designated $e \cos (\omega t + \beta_1)$ and $$e \cos (\omega t + \beta_2)$$

respectively. After passing through amplifiers 83 and 84, these voltages are applied to multiplier circuits 85 and 86, respectively. Each circuit may be any of several kinds but at present it is preferred to employ a true multiplier such as the familiar Hall-effect multiplier. The voltage from the amplifier 82 is applied to both multipliers 85 and 86 so that the output of the multiplier 85 is a voltage of the form $$\frac{e^2}{2} [\cos (2\omega t + \beta_1) + \cos \beta_1] \quad (10)$$

while the output of the multiplier 86 is a voltage of the form $$\frac{e^2}{2} [\cos (2\omega + \beta_2) + \cos \beta_2] \quad (11)$$

The above voltages are subtracted by a circuit 87 which may, for example be a simple resistive netwtork. It is apparent that the remainder can be zero only if $\beta_1$ and $\beta_2$ lie equally above and below that value which would make the average value of Expressions 10 and 11 a maximum. When this condition obtains, $\beta_1 + \beta_2/2$, or $\beta$, the average of $\beta_1$ and $\beta_2$ is equal to $\alpha$, the phase difference between the signals generated by the sensors 53 and 54. In turn, $\alpha$ is equal to the phase angle $\phi$ (FIGURE 4) which is related to range by Equation 5.

It remains to make the output of the subtraction circuit 87 equal to zero. Subtraction of voltages of the form of Expressions 10 and 11 yields a voltage having an alternating component [from the terms of the form $\cos (2\omega t + \beta)$] and a unidirectional component (from the terms of the form $\cos \beta$). As previously mentioned, the average of the alternating component (in D.C. terms) is zero leaving the unidirectional component as the only portion of interest. Accordingly, the output of the subtraction circuit 87 constituting the error signal is passed through a low pass filter 88 to suppress the alternating components and then to a servo amplifier 89 which controls the motor 71 which drives the gear 67 (FIGURE 6) to adjust the angular position of the "read" heads 68 and 69 to make the error signal zero. At this time (as previously mentioned) the angle $\beta$ between the "record" head 63 and the center line between the "read" heads 68 and 69 is equal to the phase angle $\phi$ (FIGURE 4) which is related to range by Equation 5. The synchro transmitter 73, turned by the gear 67 (FIGURE 4) transmits three wire information indicative of the angle $\phi$ to remote points, where it may be used as an input to a computer or to control a visual display of range.

While a preferred embodiment of the invention has been described in considerable detail for illusrative purposes, many modifications within the spirit of the invention will occur to those skilled in the art. It is therefore desired that the protection afforded by Letters Patent be limited only by the true scope of the appended claims.

What is claimed is:

1. Apparatus for measuring the distance to a target, comprising,
    first and second sensors each generating a signal indicative of the intensity of the light falling thereon,
    optical means for defining first and second divergent paths from said first and second sensors respectively to said target,
    and for simultaneously directing light reflected from different areas of said target to said sensors, respectively,
    means for rotating said optical means for scanning the same area in successive same circular paths on said target successively,
    whereby the signals generated by said sensors are identical in form but displaced in time, and
    means for measuring the time displacement between like portions of said signals.

2. Apparatus for measuring the distance to a target, comprising,
    first and second sensors each generating a signal indicative of the amount of light falling thereon,
    optical means for defining two nonparallel light paths each from one of said sensors to said target,
    and for simultaneously applying light reflected from first and second areas of said target to said first and second sensors, respectively whereby the distance between such areas is a function of range,
    means for rotating said optical means and said sensors about the same axis and on equal radii for simultaneously scanning successive same areas of the same target with the scan of the area by the second sensor displaced in time from the scan of the same area by the first sensor, and mean for measuring the time elapsing between the scanning of a point by one of said sensors and the scanning of the same point by the other of said sensors.

3. Apparatus for measuring the distance to a target, comprising, optical means for defining first and second light paths diverging from said apparatus to said target and intersecting said target at first and second discrete spaced apart points, first and second light sensors generating signals indicative of the amount of light falling thereon, said first and second sensors being positioned for receiving light reflected from said first and second points along said first and second paths respectively, means for rotating said optical means and said sensors as a unit about an axis which extends from said apparatus to said target for rotating said first and second points for defining a single circle on said target, whereby said sensors generate signals at the rotational frequency which are alike in form but displaced in phase, and means for measuring the phase displacement of said signals.

4. Apparatus for measuring the distance to a target, comprising, optical means for defining first and second divergent light paths from said apparatus to said target, first and second photoelectric sensors positioned for receiving light reflected from said target along said first and second paths respectively, and said sensors positioned for simultaneously receiving light reflected from different areas respectively of said target, means for rotating said optical means and said sensors about an axis which extends from said apparatus to said target and which axis is equidistant from, and parallel to the plane containing, said light paths, for generating signals by said sensors which are identical in form but different in phase, and means for measuring the phase difference between said signals.

5. Apparatus for measuring the distance to a target comprising, first and second sensors each generating a signal indicative of the amount of light falling thereon, optical means for defining first and second divergent paths from said first and second sensors respectively to said target, means for rotating said sensors and said optical means as a unit about an axis which extends from said apparatus to said target and which axis is parallel to and spaced from the plane containing said light paths, for generating signals by said sensors which are alike in form but displaced in time, and means for measuring the time displacement between like portions of said signals.

6. Apparatus for measuring the distance to a target, comprising, lens means for forming an image of a portion of said target, reflective means positioned on the image side of said lens for directing rays of light passing through said lens from said target to a path approximately parallel to but displaced from the axis of said lens means, a plate containing two small apertures mounted on said path, first and second photoelectric sensors each generating a signal indicative of the amount of light falling thereon, said sensors being mounted behind said plate so as to receive light from said target which has passed through said lens means and said apertures, means for rotating said lens means, said reflective means, said plate and said sensors about an axis coincident with said path, whereby at any one time said sensors receive light reflected from different areas of said target, and whereby said sensors generate signals which are substantially identical in waveform but displaced in time, and means for obtaining a measure of the time displacement between said signals, said measure of time displacement being indicative of the distance to said target.

7. Apparatus for measuring the distance to a target, comprising, first and second sensors each generating a signal indicative of the amount of light falling thereon, optical means for defining first and second divergent paths from said first and second sensors respectively to said target, for simultaneously directing light reflected from different areas respectively of said target to the respective sensors, means for rotating said optical means and said sensors about an axis which extends from said apparatus to said target for scanning in the same circular path on said target successively, for generating a signal by said second sensor which is similar in form but delayed in time with respect to the signal generated by said first sensor, means for delaying the signal generated by said first sensor, a correlator for comparing the delayed signal with the signal generated by said second sensor and for generating a voltage indicative of the quality of their correlation, and means controlled by said voltage for adjusting the amount by which said signal generated by said second sensor is delayed so as to maximize said correlation.

8. Apparatus for measuring the distance to a target, comprising, first and second photoelectric sensors generating first and second signal indicative of the amount of light falling thereon, optical means for defining first and second divergent paths from said first and second sensors respectively to said target, means for rotating said sensors and said optical means as a unit about an axis which extends from said apparatus to said target and which axis is parallel to and spaced from the plane containing said light paths for providing a first signal generated by said first sensor and a second signal generated by said second sensor, and said second signal is similar in form but delayed in time with respect to said first signal, means for storing said first signal, means for reading out the signal so stored, and means for adjusting the time interval between storage and readout so as to obtain maximum correlation between said second signal and the signal as read out, whereby said time interval is a measure of the distance to said target.

References Cited by the Examiner
UNITED STATES PATENTS

| | | | |
|---|---|---|---|
| 2,401,691 | 6/1946 | Luboshez | 88—2.7 |
| 2,830,487 | 4/1958 | Griffith. | |
| 2,866,373 | 12/1958 | Doyle et al. | 88—1 |
| 2,960,908 | 11/1960 | Willits et al. | |

JEWELL H. PEDERSEN, *Primary Examiner.*

RONALD L. WIBERT, *Examiner.*